United States Patent Office 2,830,078
Patented Apr. 8, 1958

2,830,078

METHOD FOR PREPARING UNSATURATED AROMATIC COMPOUNDS

Frank Fekete, Buffalo, N. Y., assignor to Pittsburgh Plate Glass Company, Allegheny County, Pa., a corporation of Pennsylvania No Drawing. Application January 5, 1956
Serial No. 557,451

7 Claims. (Cl. 260—486)

This invention relates to a method for preparing novel polymerizable monomeric compounds, and pertains more particularly to the reaction of haloalkyl derivatives of alkyl aromatic compounds with the salts of alpha, beta-ethylenically unsaturated monocarboxylic acids.

Useful haloalkyl derivatives of alkyl benzenes can be prepared by reacting an alkyl benzene such as xylene, and particularly meta xylene, with an aldehyde such as formaldehyde, in the presence of hydrogen chloride or other hydrogen halide. It is thus possible to prepare compounds of the general molecular structure $$Ar(R_1-X)_n$$

wherein Ar is an alkyl substituted aromatic radical, $R_1$ is alkylene, X is halogen such as chlorine or bromine, and $n$ is a whole number from 1 to 3. The alkyl groups attached to the aryl radical are preferably methyl, but may also be ethyl, propyl, butyl, or the like. Groups or radicals required to satisfy the carbons in the benzene ring and which are not alkyl or haloalkyl groups mays be hydrogen, chlorine, bromine or the like. One particularly useful example of such compounds is 4,6-di(chloromethyl)m-xylene, which may also be termed dichlorodurene.

It has now been discovered that the haloalkyl derivatives of alkyl aromatic compounds react readily with salts of alpha, beta-ethylenically unsaturated monocarboxylic acids in the presence of a solvent comprising either dimethyl formamide or dimethyl sulfoxide to give novel monomeric compounds, which in turn polymerize to form hard homopolymers or interpolymerize with other monomers to form useful interpolymers. The homopolymers and interpolymers are useful in coating compositions, as casting or molding compositions, and the like.

The process of this invention may be depicted structurally as follows, wherein 4,6-di(chloromethyl)m-xylene and the sodium salt of methacrylic acid are utilized for illustrative purposes:

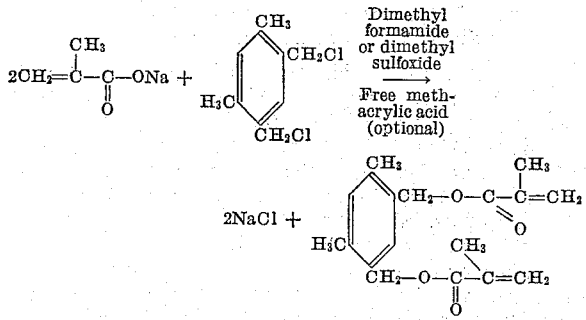

Any compound having the structure $$Ar(R_1-X)_n$$

wherein Ar, $R_1$, X and $n$ have the significance given hereinabove, may be utilized in the process of this invention. Preferably, however, Ar represents a phenyl group having one or more alkyl substituents, $R_1$ represents a methylene $(CH_2-)$ group, X is chlorine, and $n$ is either 1 or 2. Compounds of this preferred class are prepared by the chloromethylation of xylenes such as o-, m-, or p-xylene, or mesitylene (1,3,5-trimethyl benzene). Obviously, the compounds obtained may be o-, m-, or p-substituted, or mixtures of o-, m-, and p-derivatives may be obtained. Compounds in which the radical $R_1$ represents alkylene groups other than methylene, for example, ethylene, propylene, or butylene groups are obtained when acetaldehyde, propionaldehyde, and butyraldehyde are substituted for formaldehyde in the halomethylation reaction.

The alpha, beta-ethylenically unsaturated monocarboxylic acid which in the form of a salt is reacted with the haloalkyl compound is preferably acrylic acid or methacrylic acid, both of which are economically available in commercial quantities. Other alpha, beta-ethylenically unsaturated monocarboxylic acids such as 2-butenoic acid, 2-methyl-2-propenoic acid, and the like may also be utilized with good results.

As indicated hereinabove, the process of the present invention is carried out utilizing either dimethyl formamide or dimethyl sulfoxide as a solvent. Dimethyl formamide is a colorless liquid having a density of 0.968 gram per cc. at 4° C. and a boiling point of 153° C. at 760 mm., while dimethyl sulfoxide is an oil or thick syrup having a melting point of 6° C. and a boiling point of 189° C.

The quantity of dimethyl formamide or dimethyl sulfoxide utilized may be varied widely, it generally being desirable to utilize an amount such that solution is readily obtained and an easily stirrable reaction mixture is formed. This generally requires an amount of dimethyl formamide or dimethyl sulfoxide in excess of the quantity of reactants utilized, although smaller or larger amounts can be employed if desired.

In addition to the dimethyl formamide or dimethyl sulfoxide, it is a desirable but not critical expedient to utilize some free alpha, beta-ethylenically unsaturated monocarboxylic acid in the reaction mixture. Thus, if a salt of methacrylic acid is utilized as one of the reactants, free methacrylic acid would be utilized in the reaction mixture, and if a salt of acrylic acid is one of the reactants, free acrylic acid would be utilized in the reaction mixture.

The quantity of free alpha, beta-ethylenically unsaturated acid, if one is utilized, should be about equal to the weight of the acid salt employed as a reactant in the process, although again this amount is not critical and can be varied substantially. For example, as much as one, or more than two moles of free acid can be utilized for each mole of acid salt if desired, and less than a mole of free acid can be employed per mole of acid salt.

The reaction of this invention may be carried out in several different ways. One preferred method involves heating the dimethyl formamide or dimethyl sulfoxide, and the free alpha, beta-ethylenically unsaturated monocarboxylic acid (if one is employed) together with a small quantity of a polymerization inhibitor to prevent polymerization of the alpha, beta-ethylenically unsaturated monocarboxylic acid, to a temperature of about 120° C. to 130° C., and then adding the salt of the alpha, beta-ethylenically unsaturated monocarboxylic acid in increments, one portion being added as soon as the first portion dissolves. The haloalkyl aromatic compound is then added, reaction taking place almost immediately, as indicated by salt formation. To insure complete reaction the temperature is raised to about 150° C. for approximately 10 minutes, after which the reaction mixture is allowed to cool while being stirred continuously.

On cooling, the alkali metal salt separates from the liquid layer and can be removed simply by filtering. The liquid layer is then placed in a separatory funnel, diluted with toluene or other aromatic hydrocarbon, and the resulting mixture washed with water. The solvent medium can be removed in the water layer while the desired product remains in the toluene layer. The toluene layer is then washed with water until substantially neutral, dried and distilled to give the final product.

Alternatively, the reaction can be carried out simply by admixing the reactants, solvents, and inhibitor and heating the resulting mixture, preferably to reflux, for about 20 to 30 minutes. The alkali metal salt is removed by filtering and the remainder of the reaction mixture treated as described in the foregoing paragraph.

Still another method of carrying out the reaction involves eliminating the free alpha, beta-ethylenically unsaturated monocarboxylic acid entirely, and refluxing a mixture of the acid salt and the solvent in the presence of a polymerization inhibitor.

The quantity of reactants utilized in carrying out the reaction depends of course on the number of haloalkyl groups of the alkyl aromatic compound which are to be replaced. For example, if it is desired to couple only one alpha, beta-ethylenically unsaturated monocarboxylic acid residue to the alkyl aromatic compound, then the reaction is carried out utilizing equal molecular quantities of the reactants, or by utilizing a slight excess of the acid salt. If it is desired to replace two haloalkyl groups, two moles of the acid salt, or a slight excess, are employed, although it is to be understood that regardless of the quantity of acid salt utilized at least some mono- and some di-substituted derivatives are obtained. Although there is no economic advantage in doing so, larger or smaller amounts of either reactant may be utilized.

The following examples illustrate in detail the novel process of this invention. This examples are not intended to limit the invention, however, for there are, of course, numerous possible variations and modifications in the procedures herein described.

*Example I*

The following materials were charged into a glass reactor:

Monochloromethyl xylene____ 77.2 grams (0.5 mole).
Potassium methacrylate_____ 68.3 grams (0.55 mole).
Hydroquinone _____ 5.0 grams.
Methacrylic acid_____ 70.0 grams.
Dimethyl formamide_____ 150.0 grams.

The resulting mixture was heated to reflux with continuous stirring. The reaction proceeded rapidly as indicated by the deposition of potassium chloride as the reaction progressed. After 2 hours the heating was discontinued and upon cooling a clear brown liquid layer separated from the solid potassium chloride. The latter was separated by filtering and washed with dimethyl formamide. The filtrate was washed with water and toluene was added to dissolve the product layer. The toluene layer was repeatedly washed with water to a neutral point and after drying over anhydrous sodium sulfate was distilled to give an excellent yield of dimethylbenzyl methacrylate, refractive index at 25°=1.5125; B. P. 105° C.-111° C./1.3 mm.

*Example II*

Alpha$^3$, alpha$^5$-durenediol dimethacrylate was prepared utilizing the following materials:

| | Grams |
|---|---|
| 4,6-di(chloromethyl)m-xylene | 101.5 |
| Potassium methacrylate | 131.5 |
| Hydroquinone | 15.0 |
| Methacrylic acid | 131.5 |
| Dimethyl formamide | 200.0 |

The reaction was carried out at reflux temperature for 2 hours. The potassium chloride quickly separated from the reaction mixture by settling to the bottom of the reactor. The liquid layer was removed by decantation and the salt removed by filtering. The salt was washed with dimethyl formamide and the filtrate added to the decanted layer. To the liquid layer 500 cc. of toluene were added and the mixture washed with water to a neutral point. The toluene layer was distilled to give a nearly quantitative yield of the desired product.

*Example III*

Dimethylbenzyl acrylate was prepared from the following materials:

| | Grams |
|---|---|
| Monochloromethyl xylene | 38.8 |
| Sodium acrylate | 27.5 |
| Hydroquinone | 3.0 |
| Dimethyl formamide | 100.0 |
| Acrylic acid | 27.5 |

The reaction mixture was refluxed for about 15 to 20 minutes with constant stirring to prevent polymerization of the acrylic acid at the bottom of the reactor. During the progress of the reaction potassium chloride precipitated and after cooling of the reaction mixture the salt was removed by filtering. The liquid portion was dissolved in toluene and washed with water to a neutral point. The water layer was decanted and the toluene layer dried over anhydrous sodium sulfate and distilled. Seventy grams of dimethylbenzyl acrylate (99 percent) was obtained.

*Example IV*

Dimethylbenzyl methacrylate was prepared without free methacrylic acid being present in the reaction mixture. The following materials were charged into a glass reactor:

| | Grams |
|---|---|
| Monochloromethyl xylene | 77.3 |
| Potassium methacrylate | 65.0 |
| Dimethyl formamide | 240.0 |
| Hydroquinone | 5.0 |

The reactants were heated for 30 minutes to reflux, the reaction mixture being shaken constantly. The potassium chloride which formed separated and was filtered and dried. Forty grams of potassium chloride was obtained, this indicating that 100 percent reaction was attained. The filtrate was diluted with toluene and washed with water to a neutral point, and after drying over sodium sulfate was distilled at 0.9 mm. pressure. Seventy-five grams of product (75 percent) was obtained.

*Example V*

The following materials were charged into a glass-lined reactor:

Monochloromethyl xylene____ 463 grams (3 moles).
Potassium methacrylate_____ 390 grams (3.05 moles).
Hydroquinone _____ 10 grams.
Dimethyl formamide_____ 1500 grams.
Methacrylic acid_____ 390 grams.

The methacrylic acid was placed in the reactor (fitted with a stirrer, condenser and temperature measuring means), together with the dimethyl formamide and 10 grams of hydroquinone. This mixture was heated to about 140° C., at which point the potassium methacrylate was added incrementally, one portion being added as the previously added portion dissolved. After addition of the salt was complete, the temperature was raised to 150° C. when refluxing occurred, and was held there until all the salt had dissolved. At this point the monochloromethyl xylene was added and potassium chloride was observed to precipitate. The mixture was kept at reflux for 10 minutes after which heating was discontinued and the mixture cooled in an ice water bath. On cooling, the potassium chloride separated from the liquid and was removed by filtering. Two hundred twenty-three grams of potassium chloride (theory 223.7 grams) was obtained.

indicating that complete coupling of the reactants had taken place.

The filtrate was washed with water to a neutral point after having been diluted with toluene. The toluene layer was then separated and dried over anhydrous sodium sulfate. The toluene layer was then distilled at 0.8 mm. pressure, and 500 grams of dimethylbenzyl methacrylate (83 percent) was obtained.

*Example VI*

Alpha$^3$, alpha$^5$-durenediol dimethacrylate was prepared from the following materials:

| | Grams |
|---|---|
| 4,6-di(chloromethyl)m-xylene | 405 |
| Potassium methacrylate | 520 |
| Methacrylic acid | 520 |
| Dimethyl formamide | 2000 |
| Hydroquinone | 15 |

The methacrylic acid, hydroquinone and dimethyl formamide were placed in a glass reactor and heated to about 140° C., after which the potassium methacrylate was added in successive increments until all the salt had entered solution. The 4,6-di(chloromethyl)m-xylene was then added and the coupling reaction occurred almost instantly as indicated by potassium chloride deposition. The reaction mixture was maintained at reflux temperature of 140° C. to 150° C. for 10 minutes, after which the reaction mixture was cooled, and the potassium chloride separated by filtration. Two hundred ninety-three grams of potassium chloride was obtained, the theoretical yield being 298 grams, indicating that substantially complete coupling had taken place.

The filtrate was diluted with toluene and the mixture washed with water until neutral. The product enters the toluene layer while the free acid and the dimethyl formamide are removed from the water layer. The product layer was freed of solvents by evaporation. The liquid product was dissolved in diethyl ether and two isomeric products separated by "freezing out" the solid isomer. The solid isomer is a white crystalline solid with a melting point of 45° C. Fifty-six percent liquid isomer and 44 percent solid isomer were obtained.

*Example VII*

This example illustrates the use of dimethyl sulfoxide as the solvent. The following materials were charged into a glass reactor:

| | Grams |
|---|---|
| 4,6-di(chloromethyl)m-xylene | 405 |
| Potassium methacrylate | 520 |
| Methacrylic acid | 520 |
| Dimethyl sulfoxide | 2000 |
| Hydroquinone | 15 |

The reaction was carried out in the manner described in the foregoing example, the reaction mixture being refluxed at 140° C. for 10 minutes after which the temperature was raised to 145° C. for an additional 10 minutes. On cooling, the potassium chloride separated and was removed by filtering. A substantially theoretical yield of the potassium chloride was obtained. The filtrate was diluted with toluene, the water layer removed by decantation and the toluene layer distilled to give a nearly quantitative yield of alpha, alpha'-durenediol dimethacrylate.

When the above examples are repeated utilizing other haloalkyl aromatic compounds or other alkali metal salts of alpha, beta-ethylenically unsaturated monocarboxylic acids, substantially equivalent results are obtained. Similarly, the reaction proceeds readily when the quantities of reactants are changed, or when the reaction temperature is increased or decreased.

All of the monomeric compounds produced by the novel process of this invention possess the structure $$(R—R_1)_n—Ar$$

wherein R is the radical derived by removing the carboxyl hydrogen atom from an alpha, beta-ethylenically unsaturated monocarboxylic acid, $R_1$ is an alkylene radical, $n$ is a whole number from 1 to 3, and Ar is an aromatic radical having at least one side chain substituent other than (R—$R_1$)-groups, and which substituents are preferably alkyl groups. As indicated hereinabove, these monomeric compounds homopolymerize readily in the presence of a peroxygen or diazo type catalyst to give useful polymeric materials, or can be polymerized with other monomeric compounds, particularly those containing a terminal $CH_2=C<$ group, to give interpolymers useful in forming films, as casting compositions or as molding compositions.

Although specific examples of the invention have been described hereinabove, it is not intended to limit the invention solely thereto, but to include all of the variations and modifications included within the scope of the following claims.

What is claimed is:

1. The method of preparing a compound of the structure $$(R—R_1)_n—Ar$$

wherein R is the radical derived by removing the carboxyl hydrogen atom from a lower-2-alkenoic acid, $R_1$ is a lower alkylene radical, Ar is a lower alkyl substituted benzene radical, and $n$ is a whole number from 1 to 3, which comprises reacting an alkali metal salt of said lower-2-alkenoic acid with a compound of the structure $$AR—(R_1—X)_n$$

wherein X is a halogen atom selected from the class consisting of chlorine, bromine, and iodine, and $R_1$, Ar and $n$ have the significance set forth hereinabove, in the presence of a polymerization inhibitor and a solvent selected from the class consisting of dimethyl formamide and dimethyl sulfoxide.

2. The method of claim 1 wherein free lower-2-alkenoic acid is incorporated in the reaction mixture in addition to the salt thereof, and the lower-2-alkenoic acid is selected from the class consisting of acrylic acid and methacrylic acid.

3. The method of claim 2 wherein the reaction is carried out at reflux temperatures.

4. The method of claim 3 wherein the alkali metal salt of the lower-2-alkenoic acid is added incrementally to the heated mixture of the free lower-2-alkenoic acid and the salt thereof followed by addition of the compound of the structure $$AR—(R_1—X)_n$$

wherein Ar is a lower alkyl substituted benzene radical, $R_1$ is a lower alkylene radical, X is a halogen atom selected from the class consisting of chlorine, bromine, and iodine, and $n$ is a whole number from 1 to 3.

5. The method of preparing $\alpha^3$, $\alpha^5$-durenediol dimethacrylate which comprises reacting 4,6-di(chloromethyl)-m-xylene with an alkali metal salt of methacrylic acid, in a ratio of about 1 mole of 4,6-di(chloromethyl)-m-xylene to about 2 moles of said alkali metal salt, in the presence of free methacrylic acid, a polymerization inhibitor, and a solvent selected from the class consisting of dimethyl formamide and dimethyl sulfoxide.

6. The method of preparing dimethylbenzyl methacrylate which comprises reacting in approximately equimolar proportions monochloromethyl xylene with an alkali metal salt of methacrylic acid in the presence of free methacrylic acid, a polymerization inhibitor, and a solvent selected from the class consisting of dimethyl formamide and dimethyl sulfoxide.

7. The method of preparing dimethylbenzyl acrylate which comprises reacting in approximately equimolar proportions monochloromethyl xylene and an alkali metal salt of acrylic acid, in the presence of free acrylic acid, a polymerization inhibitor, and a solvent selected from the class consisting of dimethyl formamide and dimethyl sulfoxide.

References Cited in the file of this patent

UNITED STATES PATENTS

| | | |
|---|---|---|
| 2,129,667 | Barrett et al. | Sept. 13, 1938 |
| 2,367,484 | Clifford | Jan. 16, 1945 |
| 2,375,301 | Joyce | May 8, 1945 |
| 2,594,184 | Ladd | Apr. 22, 1952 |

OTHER REFERENCES

Blont et al.: "Monomers" (Interscience Publishers, Inc., New York, 1951), vol. 1, "Esters of Methacrylic Acid," pp. 4, 15–16 and 48.

Yamashita et al.: Chem. Abst. 48 (1954), p. 1725 (de).

Yamashita et al.: Chem. Abst. 48 (1954), p. 9100 (hi).